United States Patent
Frisch et al.

(10) Patent No.: US 6,973,867 B2
(45) Date of Patent: Dec. 13, 2005

(54) VALVE CONTROLLED FLUIDIC ACTUATOR SYSTEM

(75) Inventors: Herbert Frisch, Göppingen (DE); Wilfried Beck, Wetzlar (DE)

(73) Assignee: Festo AG & Co., Esslingen (DE)

( * ) Notice: Subject to any disclaimer, the term of this patent is extended or adjusted under 35 U.S.C. 154(b) by 17 days.

(21) Appl. No.: 10/415,196

(22) PCT Filed: Oct. 17, 2001

(86) PCT No.: PCT/EP01/12012

§ 371 (c)(1),
(2), (4) Date: Apr. 24, 2003

(87) PCT Pub. No.: WO02/36966

PCT Pub. Date: May 10, 2002

(65) Prior Publication Data

US 2004/0025682 A1  Feb. 12, 2004

(30) Foreign Application Priority Data

Oct. 31, 2000  (DE) ............................... 100 54 561

(51) Int. Cl.$^7$ ............................................ F15B 13/044
(52) U.S. Cl. ............................................ 91/459; 92/5 R
(58) Field of Search ............................ 92/5 R; 91/459; 138/111, 104, 115

(56) References Cited

U.S. PATENT DOCUMENTS

| | | |
|---|---|---|
| 2,152,537 A | 3/1939 | Couty |
| 3,996,720 A * | 12/1976 | Hayduchok ............... 53/435 |
| 4,064,355 A * | 12/1977 | Neroni et al. ............. 138/115 |
| 4,188,081 A | 2/1980 | Holden et al. |
| 4,473,923 A | 10/1984 | Neroni et al. |
| 4,675,780 A | 6/1987 | Barnes et al. |
| 4,802,861 A | 2/1989 | Gaston |
| 4,810,207 A | 3/1989 | Butterfield |
| 5,305,798 A * | 4/1994 | Driver ..................... 138/104 |
| 5,365,984 A | 11/1994 | Simpson et al. |
| 5,658,159 A | 8/1997 | Gardner et al. |
| 5,823,088 A | 10/1998 | Frisch |
| 6,101,920 A | 8/2000 | Leonhardt |
| 6,126,290 A | 10/2000 | Veigel |
| 6,305,427 B1 * | 10/2001 | Priest, II ................. 138/104 |
| 6,311,730 B2 * | 11/2001 | Penza ...................... 138/115 |
| 6,581,619 B1 * | 6/2003 | Christiani et al. ........... 91/459 |
| 6,734,805 B2 | 5/2004 | Johnson |
| 2004/0011194 A1 | 1/2004 | Lederer et al. |

(Continued)

FOREIGN PATENT DOCUMENTS

DE  3543233 C2  6/1987

(Continued)

*Primary Examiner*—Edward K. Look
*Assistant Examiner*—Michael Leslie
(74) *Attorney, Agent, or Firm*—Hoffmann & Baron, LLP

(57) ABSTRACT

A valve controlled fluid power actuator arrangement having a fluid power valve arrangement (61) controlled by an electronic control means (63 through 65) being connected by means of at least one plastic fluid power line (11) with at least one actuator (62). In the plastic line (61) electrical line strands and/or light guides are integrated for the transmission of sensor signals. The at least one plastic line (11) is connected with the respective actuator (62) with the aid of a connection member (10) having a connection cable (29) with at least one sensor (30) in or on the actuator (62). Accordingly in the case of a valve arrangement separate from the actuators a rapid and simple fluid power and electrical or, respectively, optical assembly may take place.

20 Claims, 4 Drawing Sheets

U.S. PATENT DOCUMENTS

2004/0036290 A1   2/2004   Bock et al.

FOREIGN PATENT DOCUMENTS

| | | |
|---|---|---|
| DE | 19808645 A1 | 4/1999 |
| DE | 19827883 A1 | 1/2000 |
| EP | 0709610 A1 | 5/1996 |
| EP | 0713980 A2 | 5/1996 |
| EP | 0803653 A1 | 10/1997 |
| FR | 2466231 | 4/1981 |
| FR | 2546577 | 11/1984 |
| JP | 02038705 | 2/1990 |
| JP | 05346103 | 12/1993 |

* cited by examiner

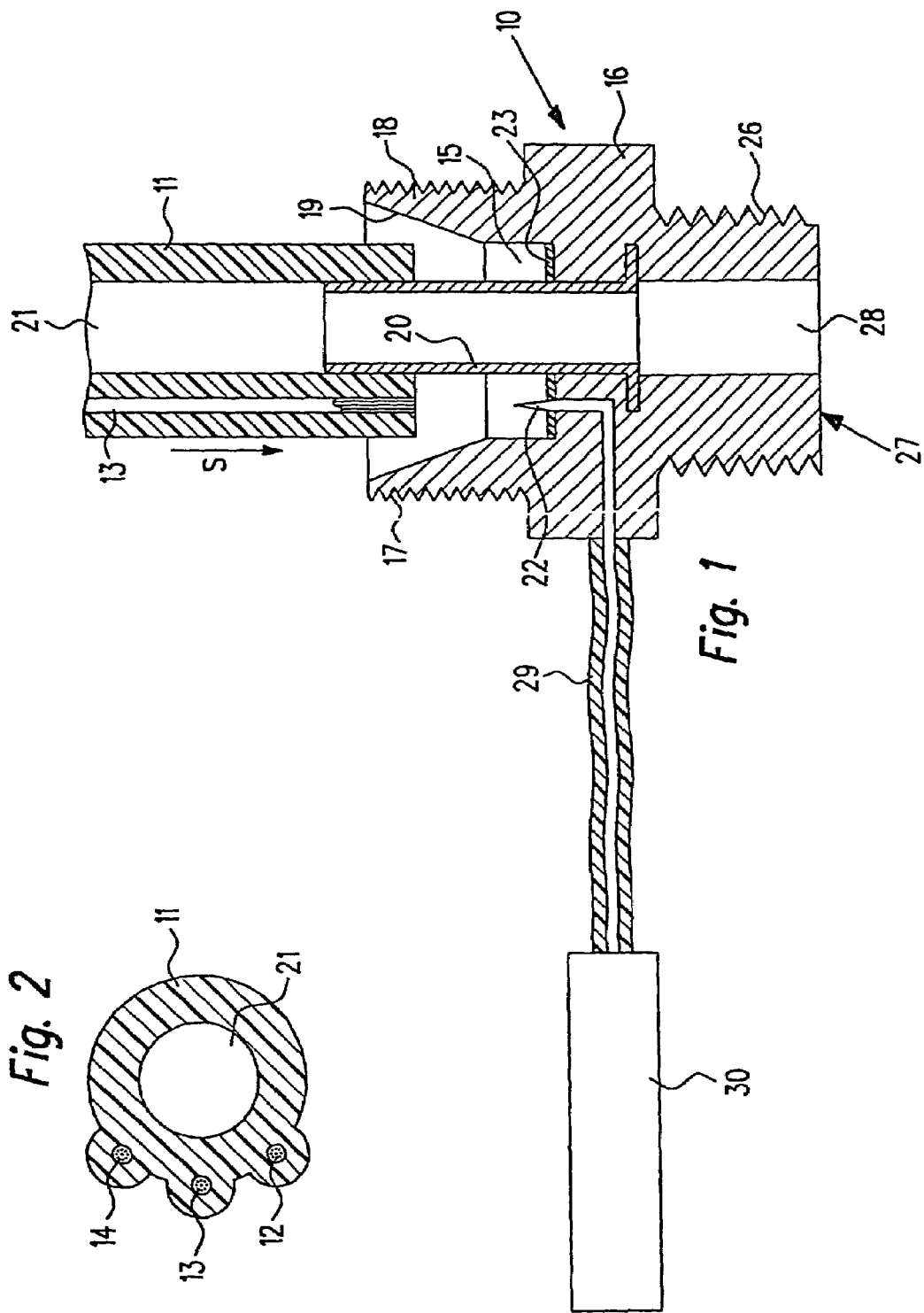

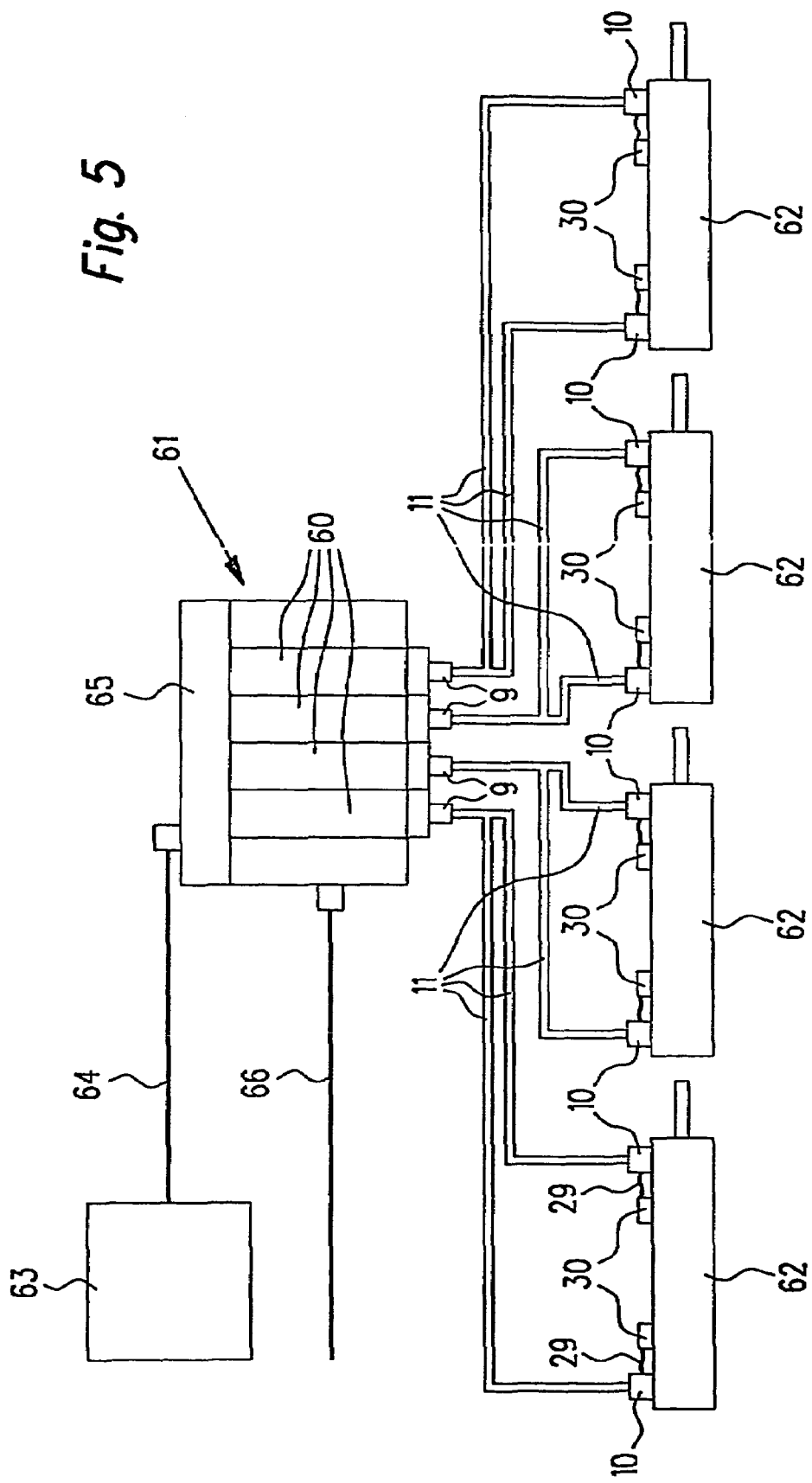

VALVE CONTROLLED FLUIDIC ACTUATOR SYSTEM

This application is the National Stage of PCT Application No. PCT/EP01/12012 filed on Oct. 17, 2001 which claims priority to German Application No. 100 54 561.0 filed on Oct. 31, 2000.

FIELD OF THE INVENTION

The invention relates to a valve controlled fluid power actuator arrangement comprising a fluid power valve arrangement controlled by an electronic control means plastic fluid power lines being provided having integrated line strands and/or light guides for the transmission of sensor signals.

BACKGROUND OF THE INVENTION

The European patent publication 0803653 A1 discloses an arrangement, in which the transmission of the working pressure and of sensor signals from position sensors to power cylinders takes place by way of electropneumatic plastic lines. In this case the electropneumatic plastic lines are connected by way of connection members with valve arrangements, which are arranged on the power cylinders. The position sensors are connected by way of electrical lines with the valve arrangements. The connection members are plugged into the valves and retained by holding screws in them. Owing to the electrical line strands in the plastic lines screwing in of the connection members is not possible. Moreover, the valves are required as connection members between the sensor lines and the line strands in the plastic lines.

SUMMARY OF THE INVENTION

One object of the present invention is to provide a valve controlled fluid power actuator arrangement in which the valve arrangement is positioned separated in space from the actuator arrangement and in which the plastic lines between the valve arrangement and the actuator arrangement on the actuator arrangement may be quickly and simply connected up with little work of the fitter so that fluid power connections and sensor connections are produced.

This object is attained in accordance with the invention using a valve controlled actuator arrangement with the features of claim 1 herein.

In an advantageous manner the connection members on the actuator or actuators automatically constitute both the fluid power connection and also the electrical or, respectively, optical connection with the sensors without optical or electrical connection having to be separately mounted. Simply the mechanical connection by itself of the plastic lines by way of the connection members with the actuators is sufficient to produce all necessary connections automatically. The danger of wrong electrical connections and confusion of connections in the case of the sensors is thereby out of the question. Replacement of sensors is also quickly and simply possible. It is possible for customary actuators, such as power cylinders, to be employed, which are adapted for valves mounted on them so that the arrangement of the line in the actuators is simplified.

The features recited in the dependent claims represent advantageous further developments and improvements in the valve controlled actuator arrangement as defined in claim 1.

The actuator arrangement appropriately comprises at least one actuator designed a power cylinder, the at least one sensor being designed in the form of a position sensor for the position of the piston in the power cylinder. In the case of an advantageous form of design the valve arrangement is connected by way of two plastic fluid power lines with the at least one power cylinder. Each of the two connection members then has a position sensor to find the terminal positions.

Quick and simple fitting is also enhanced if the at least one plastic line is connected by way of a further connection member with the valve arrangement, the electrical and/or optical connection cable of the connection member being connected with the electronic control means, which is preferably at least partly mounted on the valve arrangement. Accordingly simply by insertion of the at least one plastic line by means of the connection members both the fluid power and electrical or, respectively, optical sensor connections are automatically produced without the wrong connections being made possible.

In accordance with an advantageous development the at least one connection member possesses a line connection socket for the plastic line, which is connected with a fluid power line in the connection member and which possesses coupling means for the electrical and/or optical connection with the at least one electrical line strand and/or the light guide in the plastic line, the coupling means being connected with the electrical and/or optical connection cable on the connection member. This arrangement as well contributes to preventing wrong electrical connections and confusion of connections in the case of the sensors.

In an advantageous manner on the floor of the non-radially symmetrical line connection socket, which is adapted to the cross section of the plastic line, at least one electrical contact spike is so arranged as a coupling means that on insertion of the plastic line into the line connection socket it is aligned with the at least one electrical line strand and contacts into the latter. Accordingly by simple insertion of the plastic fluid power line into the line connection socket the electrical connections themselves are produced automatically, even despite a plurality of line strands being present in the wall of the plastic line. No additional production of electrical connections or later production thereof is required at all. Since on insertion of the plastic line into the line connection socket the contact spikes directly penetrate into the line strands a secure electrical connection is ensured, more especially since the contact spikes are inserted in the longitudinal direction into the line strands and accordingly give rise to a contact area which is longer than in the case of transverse insertion.

As an alternative or in addition the wall of the plastic line may also possess at least one light guide, optical transmitters or optical transducers then being present at the floor of the line connection socket instead of contact spikes. The advantages disclosed occur with this design as well.

The line connection socket preferably possesses piece of tube arranged parallel to the contact spike and adapted to penetrate the fluid power duct of the plastic line or consists essentially of such a piece of tube. On joining the plastic line with the piece of tube there is on the one hand the production of a sealing fluid power connection and on the other hand this piece of tube serves to center and align the plastic line and accordingly renders possible secure positioning in relation to the contact spike or spikes.

For the mechanical attachment in place a clamping fixing means is advantageous, more particularly in the form of a clamping screw means. The clamping screw means is in this case best made up of a screw thread around the line connection socket and a corresponding union nut, a wedge member, able to be moved along an oblique face by the union nut being provided to retain the plastic line by a clamping action and more particularly for clamping in place between the piece of tube and the wedge member. On screwing in the union nut there is accordingly not only the desired clamping action but furthermore in addition a pressing of the plastic line into the line connection socket so that the electrical contact between the contact spikes and the line strands is improved by compacting the material of the hose cable (contact pressure by way of the material of the hose cable).

In accordance with an advantageous design the flexible wedge member is designed in the form of a clamping ring and possesses an internal shape corresponding to the external form of the plastic line, the external diameter tapering like a wedge toward the floor of the line connection socket. This means that the clamping screw means simultaneously leads to a water-proof connection in connection with suitable sealing means.

The connection member is connected by way of an internal duct arrangement in a fluid conducting manner with the fluid power actuator or the valve arrangement, the connection member preferably having a fluid power connection screw means for screwing into the actuator or valve arrangement or being integrally formed thereon.

A particularly simple and reliable assembly and arrangement is made possible if the sensor arrangement and the electrical and/or optical connection cables are permanently connected with one another, and more particularly molded on one another. Furthermore, the at least one connection cable is preferably permanently molded on the connection member, since then a water-tight arrangement sealed off from the environment is produced. It is naturally possible for the connection cable to be connected with the connection member using a plug-in or screw connection.

One working example of the invention is represented in the drawing and will be explained in detail in the following description.

BRIEF DESCRIPTION OF THE DRAWINGS

FIG. 1 illustrates in longitudinal section a connection member with a molded on connection cable and a sensor, in the case of which a plastic fluid power line with three electrical line strands in the wall is plugged in position.

FIG. 2 shows a cross sectional elevation of the plastic fluid power line.

FIG. 5 is a diagrammatic representation of the working example of the invention having four power cylinders as an actuator arrangement.

DETAILED DESCRIPTION OF THE PREFERRED EMBODIMENTS

Figure 3:
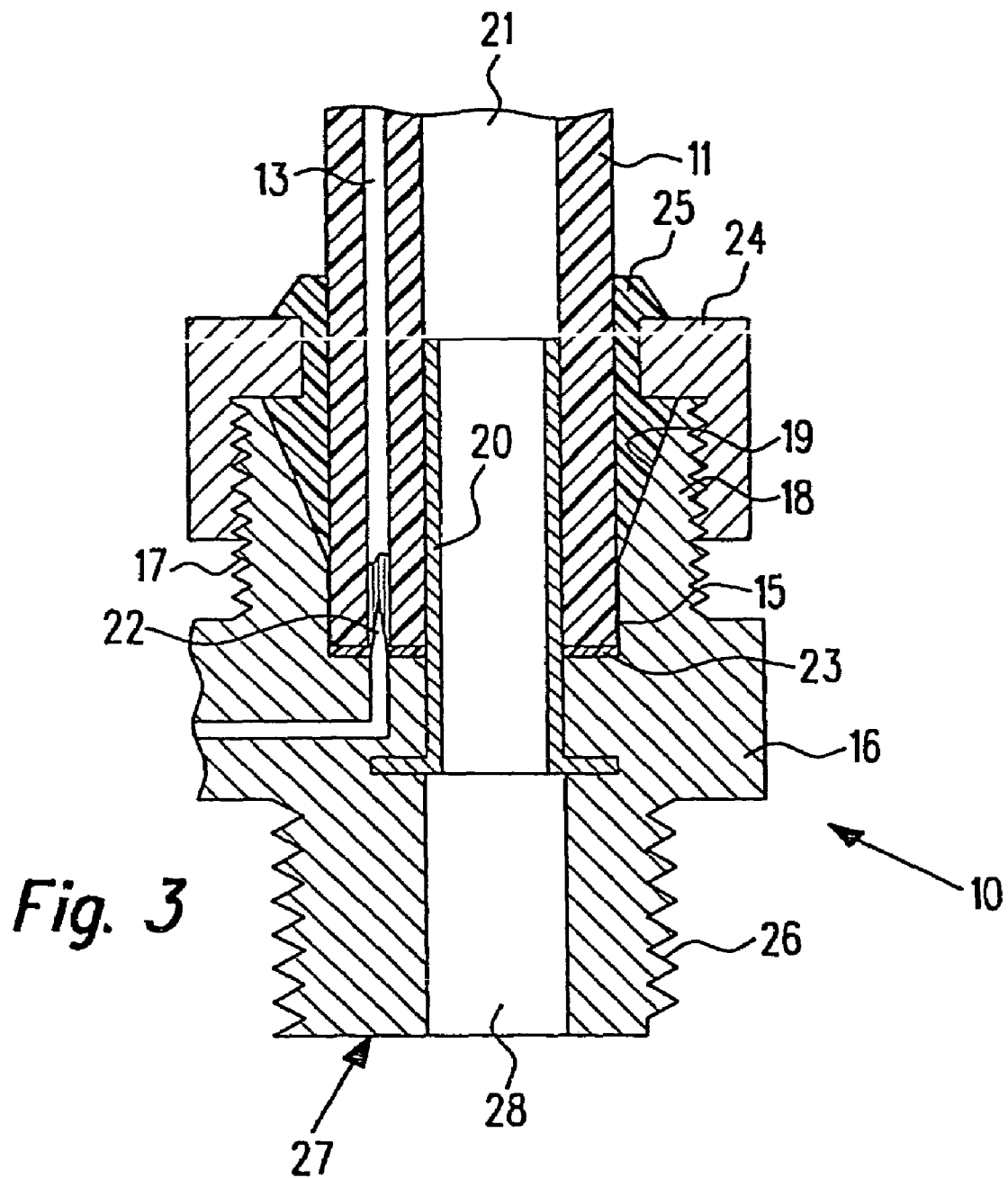
FIG. 3 shows the connection member in accordance with FIG. 1 with the completely inserted plastic line as secured by a clamping screw means.

The connection member 10 illustrated in FIGS. 1 and 3 serves essentially for connection with a flexible plastic fluid power line 11, in whose wall three electrical line strands 12 through 14 extend which for instance are in the form of fine flexible wires. The number of the line strands 12 through 14 is naturally able to be selected freely between one and a plurality of line strands.

The plastic line 11 possesses a non-radially symmetrical cross section so that insertion into a line connection socket 15 with a matching cross section of the principal body 16 of the connection member is only possible in a predetermined angular position. The line connection socket 15 is in this case surrounded by a tubular wall portion 18, having an external screw thread 17, of the principal body 16. A part of the wall portion 18 adjacent to the part with the line connection socket 15 is tapered toward its axial end so that at its internal side a circularly conical oblique face 19 is formed. The line connection socket 15 is delimited radially inward by a piece 20 of tube, which is secured or molded on or in the principal body 16 in a sealing manner, a piece 20 of tube extending in the axial direction past the free end of the wall portion 18. The external diameter of the piece 20 of tube is in this case slightly larger than the internal diameter of a fluid duct 21 in the interior of the plastic line 11.

Electrical contact spikes extend from the floor of the line connection socket 22 in a direction parallel to the piece 20 of tube into the line connection socket 15, the number and arrangement of the contact spike 22 being the same as the number and arrangement of the line strands 12 through 14 in the plastic line 11 so that on insertion of the plastic line 11 into the line connection socket 15 the contact spikes 22 slip in between the line strands 12 through 14 and create an electrically conductive connection, as is illustrated in FIG. 3. Owing to the sectional view only the contact spike 22 in contact with the middle line strand 13 is visible. Here a sealing washer 23 is placed between the floor of the socket 15 and the terminal face of the plastic line 11.

For securing the inserted plastic line 11 in the line connection socket 15 use is made of a union nut 24 provided with a screw thread 17, through which a flexible elastic clamping ring 25 like a clamping tongs or collet is able to be moved axially. The internal shape of this clamping ring 25 is in this case the same as the external shape of the plastic line 11, whereas the external form of this clamping ring 25 is circularly conical so as to be complementary at least at the circularly conical oblique face 19 of the wall portion 18 with the result that on screwing in the union nut 24 the clamping ring 25 is thrust by a wedge action against the plastic line 11 and clamps it between it and the piece 20 of tube. In this case screwing in the union nut 24, owing to the clamping ring 25 a force acts on the plastic line 11 in the insertion direction S, by which the plastic line 11 is thrust against the floor of the line connection socket 15 and consequently against the sealing washer 23. Simultaneously the contact spike 22 bite more deeply into the plastic line 11 and, respectively, the line strand 12 through 14 if they have not already penetrated fully into it during insertion. In addition owing to the compaction of the elastic material of the hose cable the contact pressure is increased.

Instead of the above described clamping sensor means it is also possible to utilize other known clamping or detent connection means or furthermore internal screw means. In the simplest case it is for instance possible to only provide the piece 20 of tube on its external side and/or wall portion 18 on its internal side with annular retaining projections for securing the inserted plastic line 11. Such retaining projections may also in addition be employed in the connection member described. Furthermore, the contact spikes 22 can be differently arranged or replaced by other contact means.

The terminal portion of the principal body 16 axially opposite to the wall portion 18 is designed in the form of a screw means for screwing into a fluid power device such as a valve, a power cylinder or the like. For this purpose this tubular screw threaded portion 27 is provided with an external or male thread 26, an internal duct 28 producing the fluid power connection from the end as far as the piece 20 of tube.

As shown in FIG. 1 an electric cable 29 is peripherally mounted or molded on the principal body 16, such cable producing the electrical connection between a sensor arrangement 30 and the contact spikes 22. If the sensor arrangement 30 should only require two lines for signal transmission, then the cable 29 may have two cores instead of three cores so that one of the contact spikes 22 is left unconnected or is omitted. The electric cable 29 may in this case be molded in a sealing manner both on the sensor arrangement 30 and also on the principal body 16. Such a sensor arrangement is for example for detecting a position, for detecting a pressure or for detecting a temperature. In this case the sensor arrangement will comprise sensors suitable for the respective detection to be performed, as for example a Hall elements for of position or other sensors responsive to magnetic and/or electrical fields.

Instead of a molded on electric cable 29 the means may also be in the form of an electrical plug-in or screw connection. Furthermore, in an alternative design a plurality of electric cables 29 may be mounted or molded on the principal body 16 or they may be connected using several plug-in or screw connection means, for example to connect a plurality of sensor arrangements or other devices with the line strands 12 through 14 in the plastic line 11.

Figure 4:
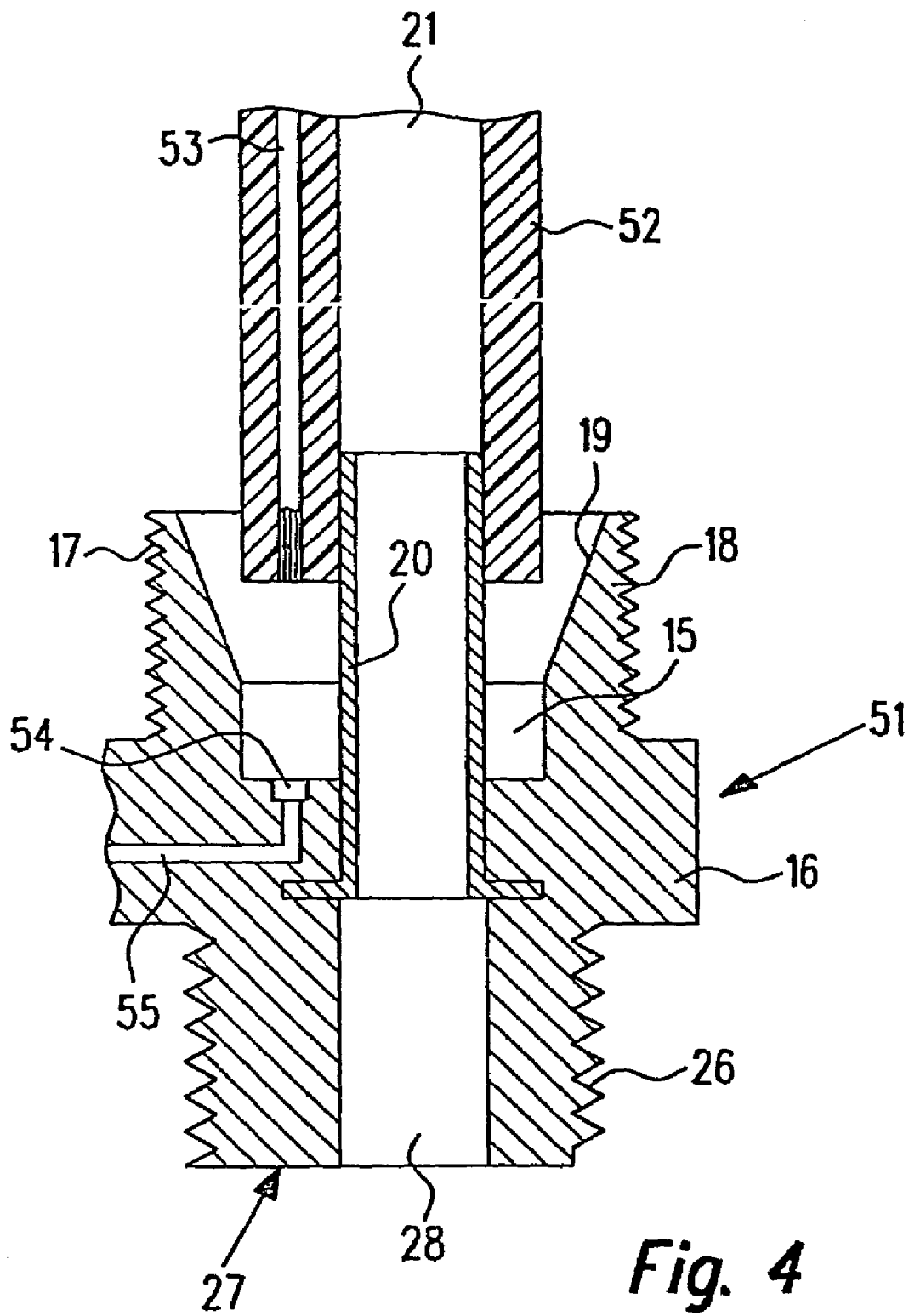
FIG. 4 depicts a further design of a connection member for optical signal transmission in a longitudinal section.

The modified connection member 51 as shown in FIG. 4 is substantially similar to the connection member 10 illustrated in FIGS. 1 and 3, identical or functionally identical components being provided with the same reference numerals and not being described over again. In contradistinction to the connection member 10 there is in this case a plastic line 52 with a suitable cross section, in whose wall instead of electrical line strands 12 through 14 there are now light guides 53. On the floor of the line connection socket 15 the contact spikes 22 are now replaced by optical transmitters 54, which, when the plastic line 52 is inserted make optical contact with the end sides of the light guides 53. The electric lines connected with the contact spike 22 and extending internally of the principal body 16 are in this case replaced by suitably arranged internal light guides 55. The workings of the connection member 51 represented in FIG. 4 are essentially the same as those of the connection member 10, only the electrical signal transmission being replaced by optical signal transmission.

With a modification of the connection member 51 it is possible, in a simpler design, for the optical transmitters 54 to be dispensed with the result that the light guides 53 in the connection member 52 come directly into optical contact with the internal light guides 55. Alternatively, the optical transmitters 54 may also be replaced by optical transducers so that in this case optical signals may be converted into electrical ones and the internal light guides 55 are replaced by electrical conductors again.

In principle hybrid designs are also possible, that is to say a plastic line may in part comprise electrical line strands and in part light guides, suitable contact spike and optical transmitters or, respectively, optical transducers being arranged in the line connection socket 15. For instance one light guide for the signal transmission and two electrical line strands for electrical amplifiers or, respectively, power supply, may be provided.

In the case the working embodiment depicted in FIG. 5 four fluid power valves 60 in the form of plate valves, of a valve station 61 are connected by way of plastic lines 11 with an actuator arrangement, which comprises fourth power cylinders 62. The number of valves 60 and of power cylinders 62 may naturally be freely selected, it being possible for other actuators to be utilized, as for example linear motors, fluid power rotary drives, fluid power gripping means or the like. If the double acting power cylinders 62 are replaced by single acting ones, then it is naturally possible to have only one respective plastic line 11.

An electronic control 63, for example in the form of a processor control, for the valve station 61 or, respectively, the power cylinders 62 is connected by way of a bus line 64 (for example an ASI bus) with a bus station 65, which is arranged athwart the planes of the plate-like valves 60 on the valve station 61, for example by plugging and is internally connected by way of lines or, respectively, plug connecting means with the solenoid coils of the individual valves 60. A fluid power line 66, as for example a pneumatic pressure line, is connected with the valve station 61 for pressure supply.

Each power cylinder 62 is connected by way of two electropneumatic plastic lines 11 with the respectively associated valve 60, the plastic lines 11 respectively being connected at the end with the power cylinders 62 using connection members 10, and with the valves 60 using modified connection members 9, which essentially comprise the wall portion 18 and the line connection socket 15 in accordance with FIGS. 1 and 3 and for example are plugged or molded for connection with the valves 60, the contact spikes 22 being connected by way of internal electrical lines with the valve station 61 in order to supply same with sensor signals. In principle it is also possible to employ a screw-in connection member 10 in this case.

The two plastic lines 11 for each power cylinder 62 serve to put the piston, not illustrated, under pressure in the opposite direction in order to have two directions of motion. The sensors 30 connected by way of electric cable 29 are designed as position sensors and are attached to the power cylinders 62 to detect the desired terminal positions or other position, conventional attachment means being employed. The connection members 10 may also respectively be connected with a plurality of sensors, as for example a plurality of position sensors and/or pressure sensors and/or temperature sensors and the like in order to obtain data in relation to the power cylinders 62. For sensor signal transmission in the plastic lines 11 the necessaary number of stands 13 is provided.

Obviously it is possible for the plastic lines 11 and the and the connection members 9 and 10 may also be optical in design, as for instance in accordance with FIG. 4. Hybrid designs are possible as well.

Although in the case of FIG. 5 each valve 60 is only illustrated with one connection member 9, naturally for the respectively two plastic lines 11 two tandem arranged connection members 9 are present. In principle however combined connection members could be utilized, which are designed for the connection of two fluid power lines.

What is claimed is:

1. A valve controlled fluid power actuator arrangement, comprising:
   a fluid power valve arrangement controlled by an electronic control means, said valve arrangement being connected by way of at least one plastic fluid power line with at least one actuator, such plastic line having electrical line strands integrated in it for sensor signal transmission, and at least one connection member connecting the plastic line with the actuator, such connection member being connected by way of a connection cable with at least one sensor in or on the actuator, and the at least one connection member including a line connection socket for the plastic line, which is connected with a fluid power line in the connection member and which possesses coupling means for an electrical connection with at least one electrical line strand in the plastic line, the coupling means being connected with the electrical connection cable on the connection member, and wherein the line connection socket is non-radially symmetrical and is adapted to fit the cross section of the plastic line, and the line connection socket has a floor on which at least one electrical contact spike is so arranged as a coupling means that on insertion of the plastic line into the line connection socket it is flush with the at least one electrical line strand and moves into same.

2. The valve controlled actuator arrangement as set forth in claim 1, characterized in that it possesses at least one power cylinder as an actuator and that the at least one sensor is designed in the form of a position sensor for the piston of the power cylinder.

3. The valve controlled actuator arrangement as set forth in claim 2, characterized in that the power cylinder is connected by way of two plastic fluid power lines with the valve arrangement.

4. The valve controlled actuator arrangement as set forth in claim 1, characterized in that the at least one plastic line is connected by a further connection member with the valve arrangement, the electrical connection cable of the connection member being connected with the electronic control means.

5. The valve controlled actuator arrangement as set forth in claim 1, characterized in that the line connection socket possesses a piece of tube aligned in the plugging direction (S) and enters a fluid power duct of the plastic line by penetration on insertion of the plastic line, or substantially consists of such a piece of tube.

6. The valve controlled actuator arrangement as set forth in claim 1, characterized in that a clamping attachment means is provided holding a plastic line inserted in the line connection socket.

7. The valve controlled actuator arrangement as set forth in claim 6, characterized in that it comprises a wall portion annularly surrounding the line connection socket and having a screw thread and a corresponding screw element, a wedge member being provided able to be moved by the screw element axially along an oblique or circularly conical face for clamping the plastic line in place.

8. The valve controlled actuator arrangement as set forth in claim 7, characterized in that the flexible wedge member is in the form of a clamping ring and possesses an internal shape matching the plastic line, an external diameter tapering in a wedge-like or circularly conical form toward the floor of the line connection socket.

9. The valve controlled actuator arrangement as set forth in claim 1, characterized in that the connection member is connected by way of an internal duct arrangement in a fluid conducting fashion with the actuator or with the valve arrangement.

10. The valve controlled actuator arrangement as set forth in claim 9, characterized in that the connection member possesses a fluid conducting joining connection for attachment on the actuator or on the valve arrangement or is molded on same.

11. The valve controlled actuator arrangement as set forth in claim 1, characterized in that the sensor arrangement and the electrical connection cable are permanently connected with one another.

12. The valve controlled actuator arrangement as set forth in claim 1, characterized in that the at least one connection cable is permanently molded on the connection member or is connected with same by means of a plug-in or screw connection.

13. The valve controlled actuator arrangement as set forth in claim 1, characterized in that the at least one sensor possesses means for adjustably securing it to the actuator.

14. A valve controlled fluid power actuator arrangement, comprising a fluid power valve arrangement controlled by an electronic control means, said valve arrangement being connected by way of at least one plastic fluid power line with at least one actuator, such plastic line having light guides integrated in it for sensor signal transmission, and at least one connection member connecting the plastic line with the actuator, such connection member being connected by way of a connection cable with at least one sensor in or on the actuator, and the at least one connection member including a line connection socket for the plastic line, which is connected with a fluid power line in the connection member and which possesses coupling means for an optical connection with at least the light guide in the plastic line, the coupling means being connected with the optical connection cable on the connection member, and wherein the line connection socket is non-radially symmetrical and is adapted to fit the cross section of the plastic line as a coupling means, and the line connection socket has a floor on which at least one optical transmitter or optical transducer is so arranged that on insertion of the plastic line into the line connection socket it is flush with the light guide and produces an optical connection.

15. The valve controlled actuator arrangement as set forth in claim 14, characterized in that it possesses at least one power cylinder as an actuator and that the at least one sensor is designed in the form of a position sensor for the piston of the power cylinder.

16. The valve controlled actuator arrangement as set forth in claim 14, characterized in that the at least one plastic line is connected by a further connection member with the valve arrangement, the optical connection cable of the connection member being connected with the electronic control means.

17. The valve controlled actuator arrangement as set forth in claim 14, characterized in that the line connection socket possesses a piece of tube aligned in the plugging direction (S) and enters a fluid power duct of the plastic line by penetration on insertion of the plastic line, or substantially consists of such a piece of tube.

18. The valve controlled actuator arrangement as set forth in claim 14, characterized in that a clamping attachment means is provided holding a plastic line inserted in the line connection socket.

19. The valve controlled actuator arrangement as set forth in claim 18, characterized in that it comprises a wall portion annularly surrounding the line connection socket and having a screw thread and a corresponding screw element, a wedge member being provided able to be moved by the screw element axially along an oblique or circularly conical face for clamping the plastic line in place.

20. The valve controlled actuator arrangement as set forth in claim 14, characterized in that the connection member is connected by way of an internal duct arrangement in a fluid conducting fashion with the actuator or with the valve arrangement.

* * * * *